US008371053B2

(12) United States Patent
Tang

(10) Patent No.: US 8,371,053 B2

(45) Date of Patent: Feb. 12, 2013

(54) NAMEPLATE

(75) Inventor: Zi-Ming Tang, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 301 days.

(21) Appl. No.: 12/966,096

(22) Filed: Dec. 13, 2010

(65) Prior Publication Data

US 2011/0289807 A1 Dec. 1, 2011

(30) Foreign Application Priority Data

May 27, 2010 (CN) .......................... 2010 1 0184791

(51) Int. Cl.
*G06F 3/18* (2006.01)

(52) U.S. Cl. ........................................................ 40/648

(58) Field of Classification Search ............... 40/661.11, 40/667, 668, 669, 648, 781; 174/153 G, 174/152 G, 66

See application file for complete search history.

(56) References Cited

U.S. PATENT DOCUMENTS 5,189,779 A * 3/1993 Fishel et al. .................... 29/453
8,051,592 B2 * 11/2011 Chang ........................ 40/661.11

FOREIGN PATENT DOCUMENTS

CN 2500182 Y 7/2002
CN 2630975 Y 8/2004

* cited by examiner

*Primary Examiner* — Casandra Davis

(74) *Attorney, Agent, or Firm* — Altis Law Group, Inc.

(57) ABSTRACT

A nameplate includes a fixing bracket and a plate. The fixing bracket includes a main body, a latching portion, and a resilient portion. The main body defines a mounting hole. The latching portion is formed on the main body and positioned adjacent to a periphery of the mounting hole. The resilient resisting portion protrudes radially from the main body and is partially received in the mounting hole of the main body. The plate is detachably and adjustably assembled to the fixing bracket and resists the resilient resisting portion of the fixing bracket. The plate has a latching member formed thereon. The latching member passes through the mounting hole and latches with the corresponding latching portion of the fixing bracket.

15 Claims, 5 Drawing Sheets

NAMEPLATE

BACKGROUND

1. Technical Field

The present disclosure relates to nameplates, and particularly, to a nameplate applied to an electronic device.

2. Description of Related Art

Nameplates are applied to a variety of devices bearing company logos, model names, and other information. Most nameplates are manufactured or made separately, and then assembled or fixed to corresponding devices.

A commonly used nameplate is fixed to a housing of a device, and includes a plate and a fixing member formed on a rear surface of the plate. The fixing member is formed by a plurality of fixing posts. The housing defines a receiving portion corresponding to the plate. A plurality of assembly holes is defined through the bottom of the receiving portion corresponding to the fixing posts. In assembly, the plate is received in the receiving portion of the housing and the fixing posts are interferentially fixed in the corresponding assembly holes.

However, when the plate is fixed to the housing, it is difficult to ensure coplanarity with the housing due to manufacturing tolerance. Additionally, as the fixing posts of the plate are interferentially received in the corresponding assembly holes of the housing, adjustment of the plate relative to the housing is also difficult.

Therefore, there is room for improvement in the art.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the nameplate. Moreover, in the drawings like reference numerals designate corresponding parts throughout the several views. Wherever possible, the same reference numerals are used throughout the drawings to refer to the same or like elements of an embodiment.

DETAILED DESCRIPTION

Figure 1:
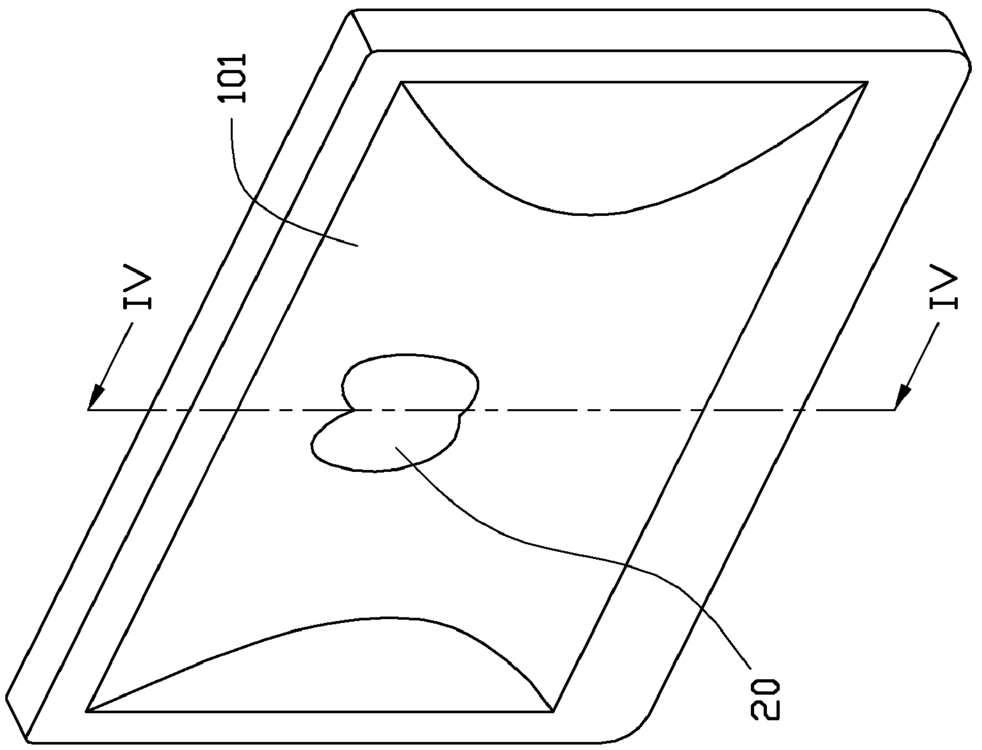
FIG. 1 is an assembled, isometric view of an embodiment of a nameplate assembled to a housing of a device.
Figure 2:
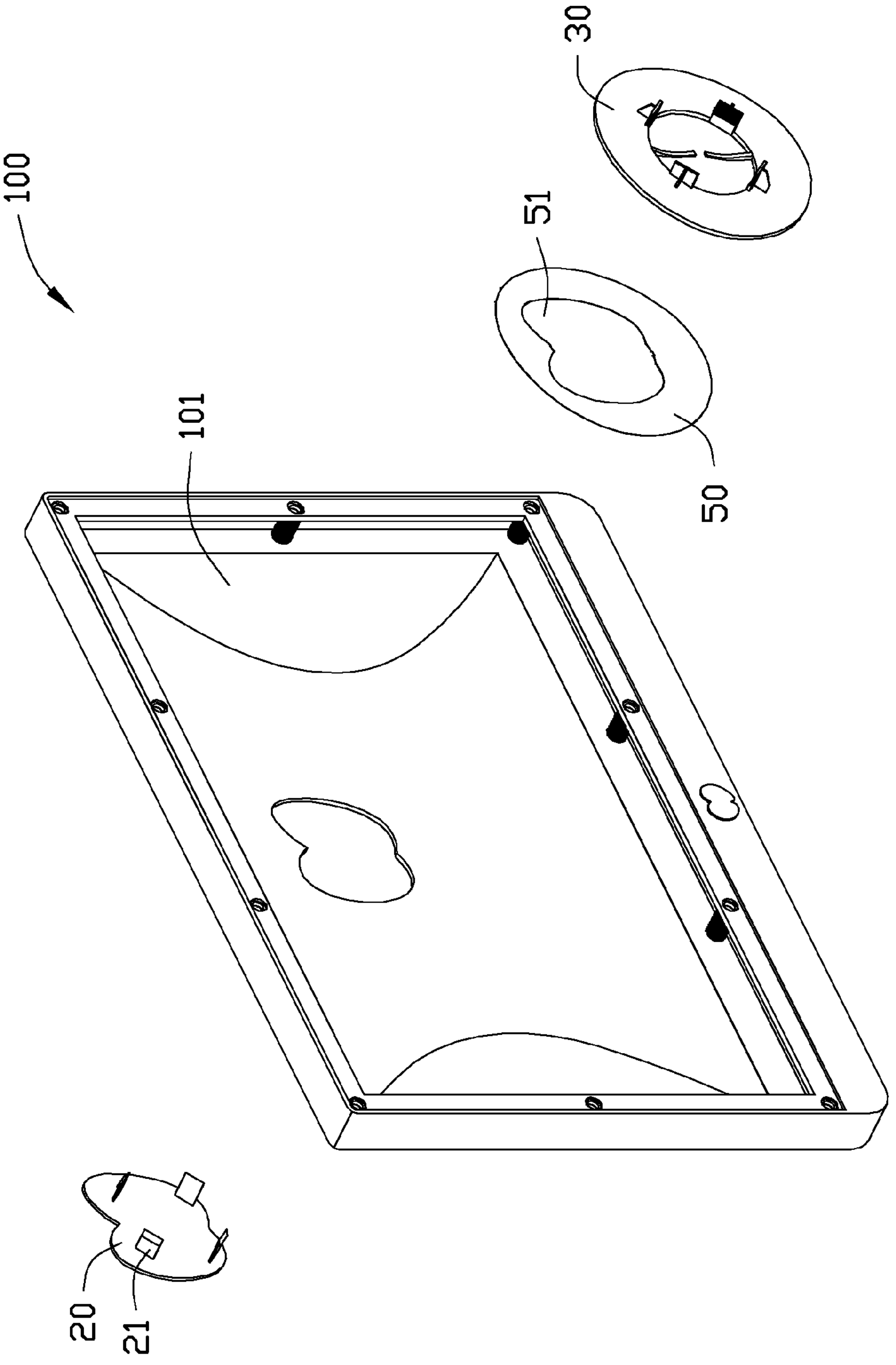
FIG. 2 is an exploded, isometric view of the nameplate shown in FIG. 1, including a plate, a fixing bracket, and a fixing member.

Referring to FIGS. 1 and 2, an embodiment of a nameplate 100 includes a plate 20, a fixing bracket 30, and a fixing member 50. The nameplate 100 is mounted to a housing 101 of an electric device (not shown). The housing 101 defines a receiving hole (not labeled) of substantially the same shape and dimension as the plate 20. The plate 20 and the fixing bracket 30 are adjustably and detachably assembled together. The fixing bracket 30 is fixed to an inner surface of the housing 101 via the fixing member 50. In the illustrated embodiment, the fixing member 50 is double-sided tape having a passing hole 51 defined therethrough of substantially the same shape and dimension as the plate 20. At least one latching member 21 is formed on a rear surface of the plate 20. In the illustrated embodiment, four latching members 21 are spaced apart adjoining a periphery of the rear surface (not labeled) of the plate 20. Each latching member 21 has a hook portion 213 formed at a distal end thereof (shown in FIG. 5).

Figure 3:
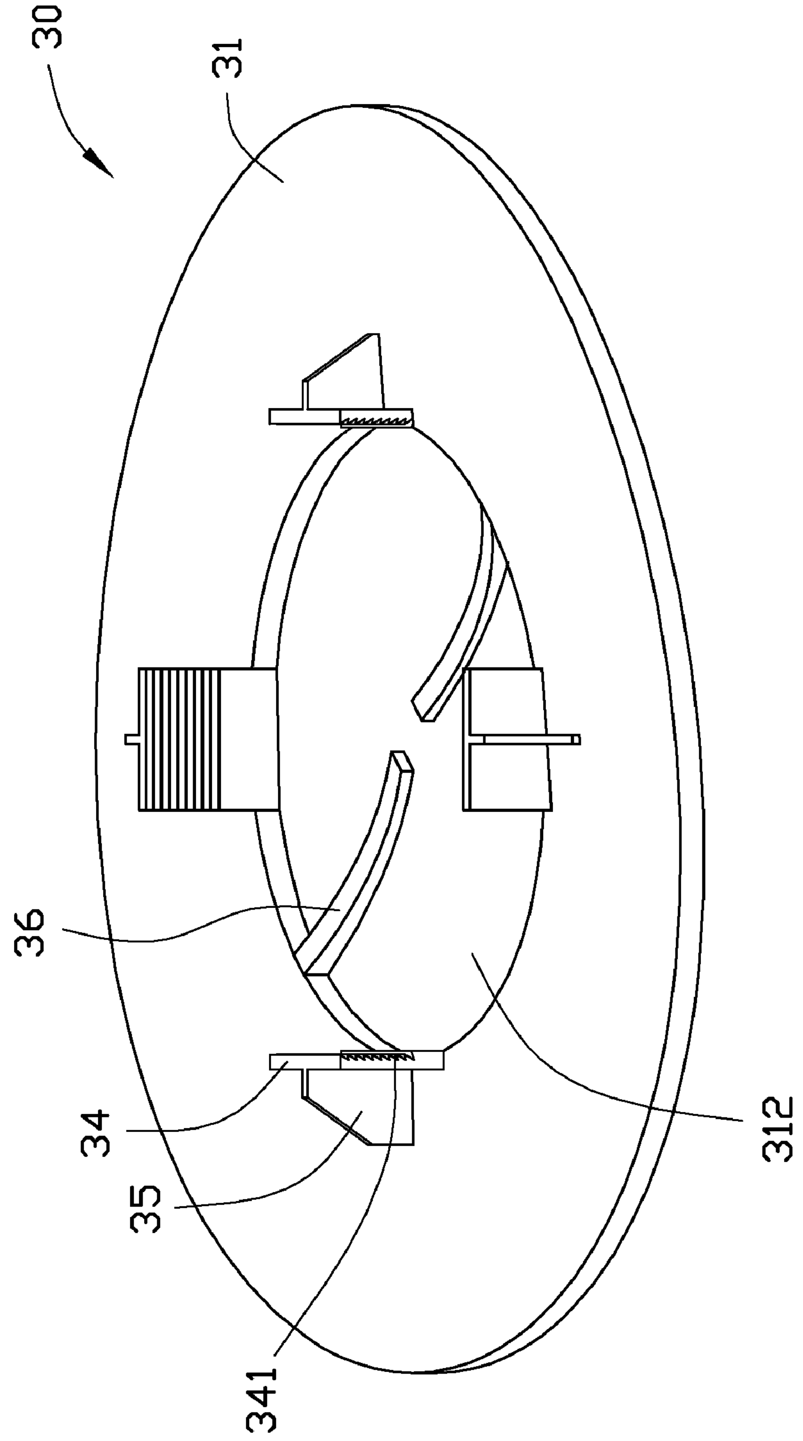
FIG. 3 is an isometric view of the fixing bracket shown in FIG. 2.

Referring to FIG. 3, the fixing bracket 30 includes a substantially circular main body 31, at least one latching portion 34, at least one reinforced portion 35, and at least one resilient resisting portion 36. A substantially circular mounting hole 312 is defined through the central portion of the main body 31. The at least one latching portion 34 is formed on the main body 31 and positioned adjacent to a periphery of the mounting hole 312. In the illustrated embodiment, four latching portions 34 are formed on the main body 31 symmetrically positioned adjoining and surrounding the periphery of the mounting hole 312. Each latching portion 34 protrudes from the main body 31, and includes a plurality of barbed heads 341 formed on a surface of the latching portion 34, toward the mounting hole 312, corresponding to the hook portion 213 of the plate 20. The barbed heads 341 are separated along an axis away from the main body 31, substantially parallel to the main body 31. Each barbed head 341 of the latching portion 34 is configured for coupling with a corresponding hook portion 213 of the plate 20.

The at least one reinforced portion 35 is formed on the corresponding at least one latching portion 34, enhancing the overall strength of the latching portion 34. In the illustrated embodiment, four reinforced portions 35 respectively formed on an outer surface of the fixing bracket 30 corresponding to the four latching portions 34 away from the mounting hole 312.

The at least one resilient resisting portion 36 protrudes radially from the inner wall of the mounting hole 312 of the main body 31 and is received in the mounting hole 312 of the main body 31. In the illustrated embodiment, two resilient resisting portions 36 are symmetrically formed in the mounting hole 312 of the main body 31 and respectively extend out from the inner surface of the mounting hole 312, ending in the substantially central portion of the mounting hole 312.

Figure 4:
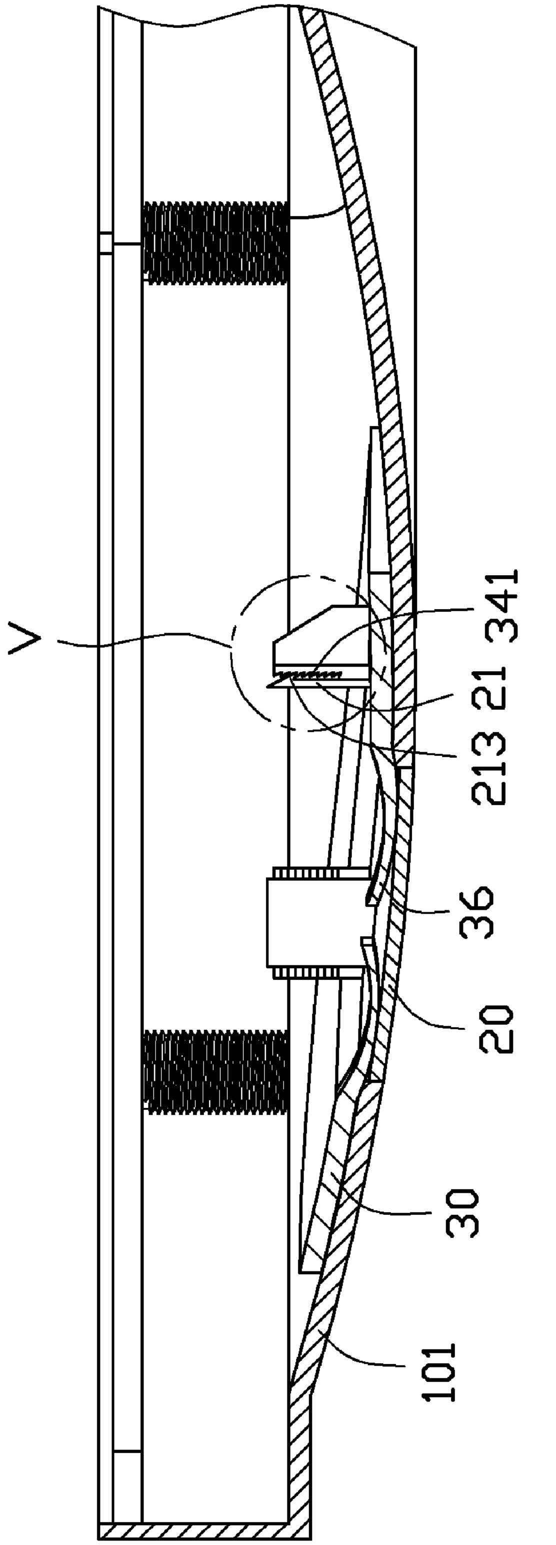
FIG. 4 is a cross-section taken along line IV-IV of FIG. 1.
Figure 5:
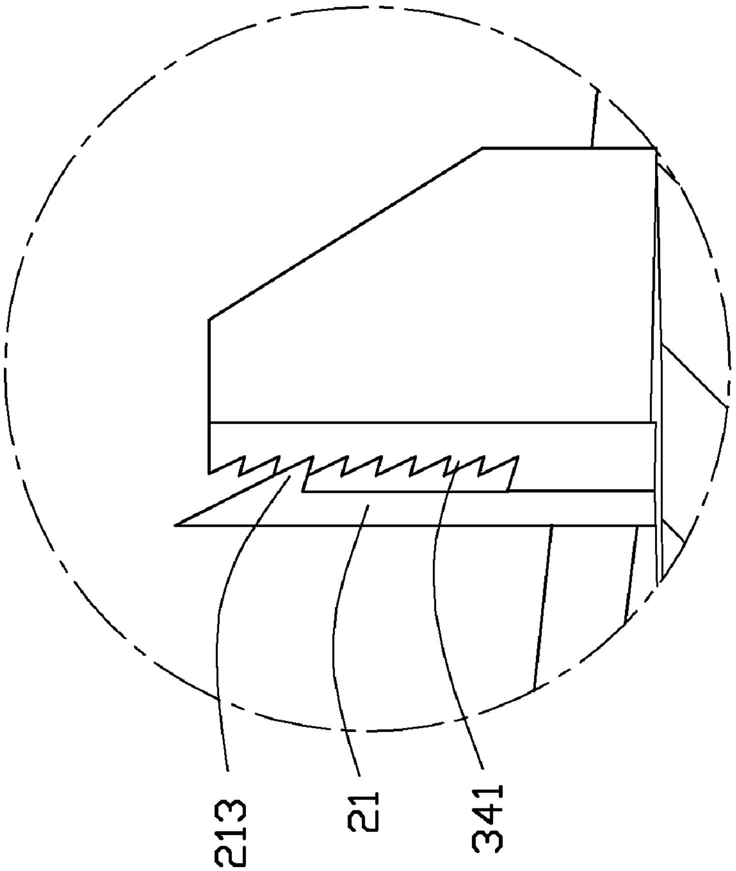
FIG. 5 is an enlarged view of a circled portion V of FIG. 4.

Also referring to FIGS. 4 and 5, during assembly of the nameplate 100, the fixing bracket 30 is fixed to the inner surface of the housing 101 via the fixing member 50. The passing hole 51 of the fixing member 50 is aligned with and coaxial with the receiving hole 102 of the housing 101. The plate 20 aligns with the receiving hole 102 of the housing 101, and the latching members 21 of the plate 20 pass through the receiving hole 102 with the hook portions 213 thereof respectively coupling with one barbed head 341 of the latching portions 34, such that the plate is adjustably mounted to the fixing bracket 30. The resilient resisting portions 36 of the fixing bracket 30 resist the rear surface of the plate 20, which is adjusted relative to the fixing bracket 30 until the plate 20 is substantially coplanar with the housing 101.

It is to be understood that the fixing member is not limited to double-sided tape, but can alternatively be a fixing screw, glue, or adhesive, configured to fix the fixing bracket 30 to the housing 101.

It is to be understood, however, that even through numerous characteristics and advantages of the disclosure have been set forth in the foregoing description, together with details of the structure and function of the present disclosure, the disclosure is illustrative only, and changes may be made in detail, especially in matters of shape, size, and arrangement of parts in the principles of the present disclosure to the full extent indicated by the broad general meaning of the terms in which the appended claims are expressed.

What is claimed is:

1. A nameplate, comprising:

a fixing bracket comprising:

a main body defining a mounting hole;

at least one latching portion protruding from the main body and positioned adjacent to a periphery of the mounting hole; and at least one resilient resisting portion protruding radially from the main body and partially received in the mounting hole of the main body; and a plate detachably and adjustably assembled to the fixing bracket and resisting against the at least one resilient resisting portion of the fixing bracket, the plate having at least one latching member passing through the mounting hole and latching with the at least one latching portion of the fixing bracket.

2. The nameplate of claim 1, wherein the at least one latching member comprises a hook portion formed at a distal end thereof, the at least one latching portion comprises a plurality of barbed heads formed on a surface of the at least one latching portion toward the mounting hole, corresponding to the hook portion; the hook portion adjustably latches with one of the barbed heads of the at least one latching portion.

3. The nameplate of claim 2, wherein the barbed heads are separated along an axis away from the main body, and all substantially parallel to the main body.

4. The nameplate of claim 3, wherein the fixing bracket further comprises at least one reinforced portion formed on the at least one latching portion thereby strengthening the at least one latching portion.

5. The nameplate of claim 4, wherein the reinforced portion is formed on an outer surface of the at least one latching portion away from the mounting hole.

6. The nameplate of claim 1, further comprising a fixing member assembled between the plate and the fixing bracket.

7. The nameplate of claim 6, wherein the fixing member is a double-sided tape adhesive having a passing hole defined therethrough with substantially the same shape and dimension as that of the plate.

8. The nameplate of claim 6, wherein the fixing member is a fixing screw or glue adhesive.

9. The nameplate of claim 1, wherein there are two resilient resisting portions symmetrically formed in the mounting hole of the main body and respectively extending out from the inner surface of the mounting hole radially and ending at the substantially central portion of the mounting hole.

10. An electronic device, comprising:

a housing defining a receiving hole; and a nameplate mounted to the housing and comprising:

a fixing member defining a passing hole and having substantially the same shape and dimension as that of the plate;

a fixing bracket fixed to an inner surface of the housing via the fixing member, the fixing bracket comprising:

a main body defining a mounting hole;

at least one latching portion protruding from the main body and positioned adjacent to a periphery of the mounting hole; and at least one resilient resisting portion protruding radially from the main body and partially received in the mounting hole of the main body; and a plate detachably and adjustably assembled to the fixing bracket and resisting against the at least one resilient resisting portion of the fixing bracket, the plate having at least one latching member passing through the mounting hole and latching with the at least one latching portion of the fixing bracket.

11. The nameplate of claim 10, wherein the latching member comprises a hook portion formed at a distal end thereof, the at least one latching portion comprises a plurality of barbed heads formed on a surface of the latching portion toward the mounting hole, corresponding to the hook portion; the hook portion adjustably latches with one of the barbed heads of the at least one latching portion.

12. The nameplate of claim 11, wherein the barbed heads are separated along an axis away from the main body, and all substantially parallel to the main body.

13. The nameplate of claim 12, wherein the fixing bracket further comprises at least one reinforced portion formed on the at least one latching portion thereby strengthening the at least one latching portion.

14. The nameplate of claim 13, wherein the reinforced portion is formed on an outer surface of the at least one latching portion away from the mounting hole.

15. The nameplate of claim 10, the fixing member is double-sided tape.

* * * * *